(12) United States Patent
Tashiro (10) Patent No.: US 8,395,861 B2
(45) Date of Patent: Mar. 12, 2013

(54) DISK DRIVE DEVICE HAVING FLUID DYNAMIC BEARING WITH POROUS MEMBER AT POSITION IN WHICH LUBRICANT IS CHARGED

(75) Inventor: Tomoyuki Tashiro, Nakhonratchasima (TH)

(73) Assignee: Alphana Technology Co., Ltd., Shizuoka (JP)

( * ) Notice: Subject to any disclaimer, the term of this patent is extended or adjusted under 35 U.S.C. 154(b) by 313 days.

(21) Appl. No.: 12/732,582

(22) Filed: Mar. 26, 2010

(65) Prior Publication Data

US 2010/0254044 A1   Oct. 7, 2010

(30) Foreign Application Priority Data

Apr. 7, 2009   (JP) .................................. 2009-092996

(51) Int. Cl.
  G11B 19/20   (2006.01)
  G11B 17/02   (2006.01)
  G11B 33/14   (2006.01)
(52) U.S. Cl. .................................. 360/99.08; 360/97.12
(58) Field of Classification Search ............... 360/98.07, 360/99.08, 97.12, 97.16
  See application file for complete search history.

(56) References Cited

U.S. PATENT DOCUMENTS

| | | | | |
|---|---|---|---|---|
| 5,678,929 | A * | 10/1997 | Parsoneault et al. | 384/107 |
| 6,664,686 | B2 * | 12/2003 | Ichiyama | 360/99.08 |
| 7,489,059 | B2 | 2/2009 | Yajima | |
| 2006/0051001 | A1 * | 3/2006 | Nishimura et al. | 384/100 |
| 2006/0207098 | A1 * | 9/2006 | Tamaoka | 384/100 |
| 2006/0232159 | A1 * | 10/2006 | Tamaoka | 310/216 |
| 2006/0244326 | A1 * | 11/2006 | Tamaoka | 360/99.08 |
| 2007/0046129 | A1 * | 3/2007 | Suginobu | 360/98.07 |
| 2007/0170805 | A1 * | 7/2007 | Tamaoka | 360/99.08 |
| 2007/0188033 | A1 * | 8/2007 | Hada | 360/99.08 |
| 2009/0297078 | A1 * | 12/2009 | Hori et al. | 384/107 |
| 2010/0247008 | A1 * | 9/2010 | Muramatsu | 384/112 |
| 2011/0142387 | A1 * | 6/2011 | Sato et al. | 384/397 |

FOREIGN PATENT DOCUMENTS

JP  2007198555 A  8/2007

* cited by examiner

*Primary Examiner* — Craig A. Renner
(74) *Attorney, Agent, or Firm* — Lowe Hauptman Ham & Berner, LLP (57) ABSTRACT

A disk drive device includes a fixed body section, a rotating body section, a bearing unit and a drive unit. The bearing unit includes a shaft that is a rotation center, a sleeve that has an accommodating portion in which the shaft is accommodated and that permits relative rotation around the shaft, a radial space defined by an inner wall surface of the sleeve-accommodating portion and an outer wall surface of the shaft, first and second radial dynamic pressure grooves that generate a radial dynamic pressure in at least one of the inner wall surface of the sleeve and the outer wall surface of the shaft that define the radial space, a lubricant charged into the radial space, and a porous filter that is disposed in at least a portion of the charging space in which the lubricant is charged, for capturing foreign matter contained in the lubricant.

12 Claims, 8 Drawing Sheets

DISK DRIVE DEVICE HAVING FLUID DYNAMIC BEARING WITH POROUS MEMBER AT POSITION IN WHICH LUBRICANT IS CHARGED

This application is based on Japanese Patent Application No. 2009-092996 filed with the Japan Patent Office on Apr. 7, 2009, the entire contents of which are hereby incorporated by reference.

BACKGROUND OF THE INVENTION

1. Field of the Invention

The present invention relates to a disk drive device, and more particularly, to a technique for reducing foreign matters floating in a lubricant of a fluid dynamic bearing.

2. Description of the Related Art

In recent years, disk drive devices such as HDDs have been dramatically improved in their rotational accuracy of a supported rotating body by providing fluid dynamic bearings. A structure of such a fluid dynamic bearing is disclosed in, for example, JP Laid-Open Publication No. 2007-198555. According to this fluid dynamic bearing, a portion of the rotating body such as a shaft includes a dynamic pressure groove for generating a dynamic pressure. When the rotating body rotates, this bearing generates a dynamic pressure by the mutual interaction with a lubricant such as oil charged around the rotating body. By filling, with a lubricant, a radial space defined by a gap between an inner periphery of a sleeve and an outer periphery of a shaft, a radial fluid dynamic bearing is formed. By filling, with a lubricant, a thrust space defined by a gap between a thrust ring and a flange section opposed to the thrust ring and a gap between an opposite surface of the thrust ring and an inner seal opposed to the opposite surface, a thrust fluid dynamic bearing is formed. These fluid dynamic bearings receive a load in a state where a rotating body is not in contact with a peripheral constituent part by floating the rotating body that is rotating in a lubricant by means of a generated dynamic pressure.

A rotating portion and a fixed portion are opposed to each other through an extremely narrow gap, thereby reducing, in size, the disk drive device having such a fluid dynamic bearing. A range of uses of such disk drive devices is increased and mobile devices are equipped with the disk drive devices widely. Requirement of reducing the disk drive devices in size is further increased. With this, requirement of reduction of the fluid dynamic bearing is also increased. That is, it is required to further narrow a gap through which a lubricant circulates.

In a disk drive device having the fluid dynamic bearing, the rotating body when it is not rotating moves in a direction of gravity due to its own weight. In a state where the rotating body is in contact with a fixed body, the rotating body stops. Thereafter, when rotation of the disk drive device is restarted, the rotating body rotates while sliding with the fixed body until a sufficient dynamic pressure for separating the rotating body from a wall surface is generated. As a result of such sliding motion, sliding parts generate shaved powder in some cases. The shaved powder is metal powder of a metal part or particulates, and becomes foreign matter in a lubricant. The foreign matter floats and moves as the lubricant flows. At that time, if the fluid dynamic bearing is reduced in size and the gap of a circulation path through which the lubricant flows is narrow, the foreign matter is caught in the narrow portion. This generates circulation failure of the lubricant or rotation failure of the rotating body. As a result, function of the bearing is deteriorated. Further, foreign matters such as metal powder and particulates adversely function as abrasives. Therefore, a surface abrasion of a member constituting the gap is accelerated, more foreign matters are generated and abrasion of the member constituting the gap proceeds at an accelerated pace in some cases. There is a problem that the foreign matters such as metal powder and particulates existing in a lubricant of a fluid dynamic bearing hinder a narrowing effort of the circulation path when a fluid dynamic bearing section is designed, and hinder a size-reduction effort of the disk drive device.

The present invention has been accomplished to solve the above problem, and it is an object of the invention to provide a disk drive device that can easily be reduced in size with a simple structure by reducing foreign matters floating in a lubricant to reduce inconvenience caused by the floating foreign matters.

SUMMARY OF THE INVENTION

To solve the above problem, an aspect of the present invention is directed to a disk drive device. The device includes: a base member, a bearing unit that is disposed in the base member and that rotatably supports a recording disk with respect to the base member; and a drive unit that rotationally drives the recording disk supported by the bearing unit. The bearing unit includes: a shaft that is a center of rotation; a sleeve that has an accommodating portion in which the shaft is accommodated and that permits relative rotation around the shaft; a radial space defined by an inner wall surface of the accommodating portion of the sleeve and an outer wall surface of the shaft; a radial dynamic pressure groove that generates a radial dynamic pressure in at least one of the inner wall surface of the sleeve and the outer wall surface of the shaft that define the radial space; a lubricant charged into the radial space; and a porous member that is disposed in at least a portion of a charging space into which the lubricant is charged, thereby capturing a foreign matter contained in the lubricant.

The porous member may be disposed at any position as far as the lubricant flows. Preferably, the porous member is disposed near a location where the shaft and the sleeve come into contact with each other when generation of the dynamic pressure is stopped by stopping the relative rotation between the shaft and the sleeve. In this case, when the rotation is restarted, it is possible to swiftly and efficiently capture a foreign matter generated by sliding motion between the shaft and the sleeve by the porous member. A sintered metal, a mesh-like material such as fiber, and material that encloses fine particles and adsorbs foreign matters on its surface can be utilized as the porous member. It is preferable that a density of the porous material of the porous member is varied from a rough state to a dense state in correspondence with a moving direction of a foreign matter contained in the lubricant.

According to this aspect of the present invention, even when foreign matters exist in a lubricant, it is possible to swiftly and easily capture the foreign matters. Therefore, even if the circulation space for a lubricant is narrowed, it is possible to suppress the inconvenience caused by clogging of foreign matters. As a result, it is possible to suppress the performance deterioration and lifetime reduction of the disk drive device. According to this embodiment, when the fluid dynamic bearing is designed, the circulation space can be reduced and thus, the disk drive device can be reduced in size.

According to the present invention, it is possible to provide a disk drive device that can easily be reduced in size with a simple structure by reducing foreign matters floating in a lubricant to reduce inconvenience caused by the floating foreign matters.

The foregoing and other objects, features, aspects and advantages of the present invention will become more apparent from the following detailed description of the present invention when taken in conjunction with the accompanying drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
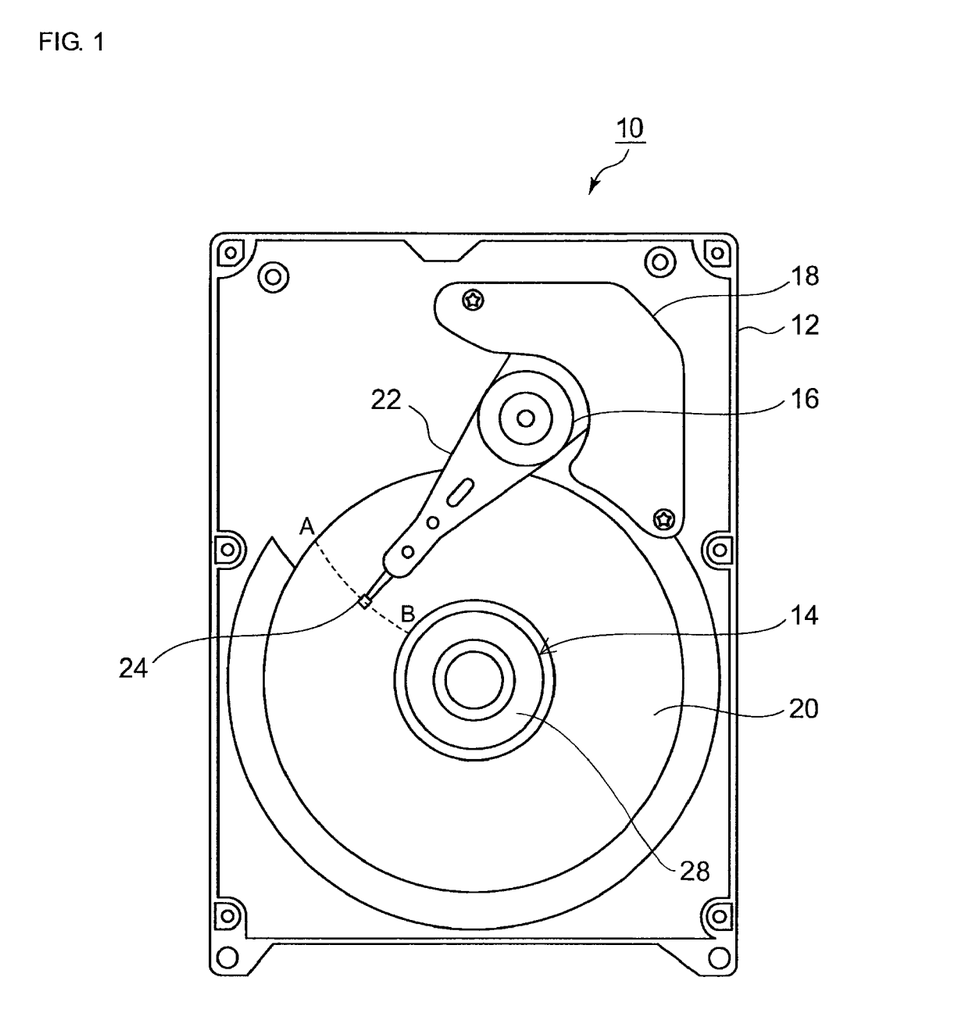
FIG. 1 is an explanatory diagram for explaining an internal structure of a hard disk drive device that is one example of a disk drive device of an embodiment.

An embodiment of the present invention will be described based on the drawings. FIG. 1 is an explanatory diagram for explaining an internal structure of a hard disk drive device (HDD) 10 (simply, disk drive device 10, hereinafter) that is one example of the disk drive device of the embodiment. FIG. 1 shows a state where a cover is detached to expose the internal structure.

A brushless motor 14, an arm bearing unit 16 and a voice coil motor 18 are mounted on an upper surface of a base member 12. The brushless motor 14 supports a hub member 28 for mounting a recording disk 20 such that the hub member 28 can rotate coaxially with the brushless motor 14. The brushless motor 14 rotationally drives the recording disk 20 that can magnetically record data. The brushless motor 14 may be a spindle motor for example. The brushless motor 14 is driven by drive currents of three phases including U-phase, V-phase, and W-phase. The arm bearing unit 16 supports a swing arm 22 in such a manner that the swing arm 22 swings freely in a range of movement AB. The voice coil motor 18 swings the swing arm 22 in accordance with external control data. At the tip of the swing arm 22, a magnetic head 24 is provided. When the disk drive device 10 is operating, the magnetic head 24 moves over the surface of the recording disk 20 with a slight space therebetween with the swing of the swing arm 22 in the range of movement AB so as to read/write data. In FIG. 1, a point A corresponds to the position of the outermost recording track of the recording disk 20. Another point B corresponds to the position of the innermost recording track of the recording disk 20. The swing arm 22 may be moved to a waiting position provided on the side of the recording disk 20 when the disk drive device 10 is in a resting state.

In the embodiment, what includes all the structures for reading/writing data such as the recording disk 20, the swing arm 22, the magnetic head 24, and the voice coil motor 18 is described as an HDD or as a disk drive device in some cases. Only the part that rotationally drives the recording disk 20 is described as a disk drive device in other cases.

Figure 2:
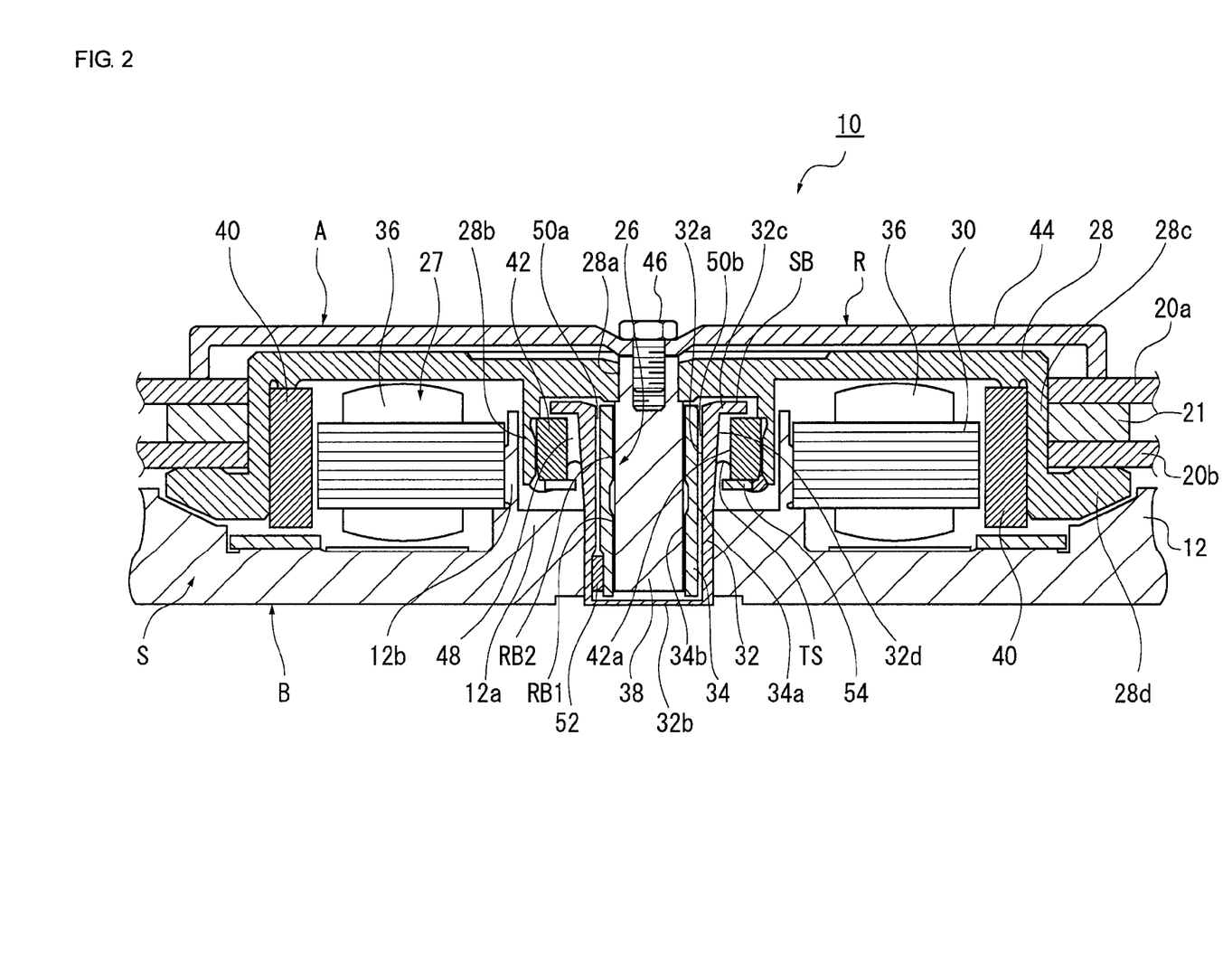
FIG. 2 is an explanatory diagram for explaining details of a fixed body section, a rotating body section, a bearing unit and a drive unit of the disk drive device of the embodiment.

As shown in FIG. 2, the disk drive device 10 of the embodiment includes a fixed body section S, a rotating body section R, a bearing unit 26 and a drive unit 27. The bearing unit 26 has a radial fluid dynamic bearing unit including radial dynamic pressure grooves RB1 and RB2 and a lubricant. The bearing unit 26 also has a thrust fluid dynamic bearing unit including a thrust dynamic pressure groove SB and a lubricant. The drive unit 27 rotationally drives the rotating body section R with respect to the fixed body section S through these fluid dynamic bearing units. FIG. 2 shows a so-called shaft-rotating type disk drive device in which the hub member 28 that supports the recording disk 20 and a later-described shaft 38 rotate in unison. The embodiment is described, for the sake of convenience, based on a condition that a side shown with an arrow A in FIG. 2 is an upper side or upward, and a side shown with an arrow B is a lower side or downward. Members constituting the disk drive device 10 can be classified to groups of the fixed body section S, the bearing unit 26, the rotating body section R and the drive unit 27. Some members are included in two or more groups. For example, the shaft 38 is included in both the rotating body section R and the bearing unit 26.

The fixed body section S includes the base member 12, a stator core 30, coils 36, a peripheral housing 32 and a sleeve 34. A first cylindrical portion 12a, and a second cylindrical portion 12b that extends toward the hub member 28 from the first cylindrical portion 12a are formed on the base member 12. The stator core 30 is fixed to an outer wall surface of the second cylindrical portion 12b. A peripheral housing 32 is fixed to an inner wall surface of the first cylindrical portion 12a by adhesion or by both press-fit and adhesion. The sleeve 34 is a cylindrical member having a cylindrical outer wall surface 34a that is fixed to an inner wall surface of the peripheral housing 32. The sleeve 34 supports the shaft 38 in a space surrounded by a cylindrical inner wall surface 34b in a state where relative rotation of the shaft 38 is permitted. Therefore, even a slight deformation of the sleeve 34 can deteriorate the rotation performance of the shaft 38. Therefore, the sleeve 34 is loosely inserted so that an external force is not applied to an interior of a cylindrical portion 32a of the peripheral housing 32. After the sleeve 34 is inserted, the sleeve 34 is adhered to an inner wall surface of the cylindrical portion 32a by an adhesive or the like.

The base member 12 can be formed in such a manner that a base metal produced from aluminum die casting is cut, or an aluminum plate is press molded, or an iron plate is press molded and thereafter plated with nickel. The stator core 30 is formed in such a manner that a plurality of magnetic plates material such as silicon steel plates are laminated on one another and then, surfaces of these magnetic bodies are subjected to insulation coating by electrodeposition coating or powder coating. The stator core 30 has a ring-shape having a plurality of salient poles (not shown) projecting outward in the radial direction thereof. A coil 36 is wound around each salient pole. If the disk drive device 10 is of three-phase driving type, the number of the salient poles is nine. Winding terminals of the coils 36 are soldered on an FPC (not shown) disposed on a bottom surface of the base member 12.

The peripheral housing 32 has an approximate cup shape, and includes the cylindrical portion 32a that intimately holds the sleeve 34 on its inner periphery, a bottom 32b that hermetically closes one end of the cylindrical portion 32a, and the flange section 32c. The flange section 32c extends outward in the radial direction of the hub member 28 such that the flange section 32c is opposed to the hub member 28 at the other end of the cylindrical portion 32a.

The rotating body section R includes the hub member 28, the shaft 38, a magnet 40 and a thrust ring 42. The hub member 28 has an approximate cup shape, and the hub member 28 includes an inner peripheral hanging portion 28b and an outer peripheral cylindrical portion 28c which are concentric with the central hole 28a, and an outwardly extending portion 28d that outwardly extends from a lower end of the outer peripheral cylindrical portion 28c. A ring-like magnet 40 is fixed to an inner wall surface of the outer peripheral cylindrical portion 28c of the hub member 28.

A base metal of the shaft 38 is stainless steel material for example. It is preferable that a surface of the shaft 38 is covered with later-described material having small coefficient of linear expansion and high wear resistance (such as SIALON ceramic). A step is provided on an upper end of the shaft 38. When the shaft 38 and the hub member 28 are assembled, the shaft 38 is press-fitted into the center hole 28a of the hub member 28. As a result, a position of the hub member 28 in the axial direction of the shaft 38 is limited by the step, and the hub member 28 is integrally formed with the shaft 38 at predetermined right angles. The hub member 28 is made of magnetic material (such as stainless steel material). The hub member 28 engages center holes of recording disks 20a and 20b that are double-supported through a spacer 21 with an outer wall surface of the outer peripheral cylindrical portion 28c, and supports the lower recording disk 20b by the outwardly extending portion 28d. As a result, the recording disks 20a and 20b are positioned with respect to the hub member 28. A substantially disk-like clamper 44 is placed on the recording disk 20a. The clamper 44 is fixed to the hub member 28 by a screw 46. With this, the recording disks 20a and 20b are fixed to the hub member 28. The hub member 28 can be made of metal such as aluminum and iron, or conductive resin, and can be formed by molding or machining the material.

When an external force is applied to the disk drive device 10 and the rotating body section R and the fixed body section S are relatively moved, the thrust ring 42 abuts against a lower surface of the flange section 32c of the peripheral housing 32. With this, the thrust ring 42 functions as a detent member that prevents the rotating body section R from coming out from the fixed body section S. The magnet 40 is made of Nd—Fe—B (neodymium-iron-boron)-based material. A surface of the magnet 40 is subjected to rustproof treatment by electrodeposition coating or spray coating. In this embodiment, the inner periphery of the magnet 40 is magnetized in 12 poles for example.

The shaft 38 of the rotating body section R is inserted along the cylindrical inner wall surface 34b of the sleeve 34 of the fixed body section S. As a result, the rotating body section R is rotatably supported by the fixed body section S through the radial fluid dynamic bearing unit including the radial dynamic pressure grooves RB1 and RB2 and the lubricant 48, and the radial fluid dynamic bearing unit including the thrust dynamic pressure groove SB and the lubricant 48. The drive unit 27 includes the stator core 30, the coils 36 and the magnet 40. At that time, the hub member 28 constitutes a magnetic circuit together with the stator core 30 and the magnet 40. Therefore, the rotating body section R is rotationally driven by sequentially energizing the coils 36 by control of a drive circuit provided outside.

Next, the bearing unit 26 will be described in detail. The bearing unit 26 includes the shaft 38, the sleeve 34 and the peripheral housing 32. The cylindrical inner wall surface 34b of the sleeve 34 and an outer peripheral surface of the shaft 38 opposed thereto form a radial space. Radial dynamic pressure grooves RB1 and RB2 that generate dynamic pressures for supporting in the radial direction are formed in at least one of the cylindrical inner wall surface 34b of the sleeve 34 and the outer peripheral surface of the shaft 38. The radial dynamic pressure groove RB1 is formed on a side far from the hub member 28. The radial dynamic pressure groove RB2 is formed on a side closer to the hub member 28 than the radial dynamic pressure groove RB1. The radial dynamic pressure grooves RB1 and RB2 are separated from each other in the axial direction of the shaft 38, and have herringbone shapes or spiral shapes. The lubricant 48 is charged into the spaces where the radial dynamic pressure grooves RB1 and RB2 are formed. Therefore, when the shaft 38 rotates, a high pressure portion is generated in the lubricant 48. This pressure separates the shaft 38 from the peripheral wall surface and with this, the shaft 38 is brought into a substantially non-contact rotation state in the radial direction.

In the case of this embodiment, one end of the shaft 38 is connected to the hub member 28. Therefore, a side of the shaft 38 close to the hub member 28 and a side of the shaft 38 far from the hub member 28 receive side pressures of different strengths. Hence, in this embodiment, a forming width of the radial dynamic pressure groove RB1 in the axial direction of the shaft 38 is narrower than a forming width of the radial dynamic pressure groove RB2 in the axial direction of the shaft 38. With this, dynamic pressures corresponding to the side pressures having different strengths in the axial direction of the shaft 38 are generated in the radial fluid dynamic bearing units. With this, optimal balance can be obtained, that is, high support rigidity of the shaft 38 is realized by generating the high dynamic pressure in this manner, and rotation loss of the shaft 38 can be reduced by generating low dynamic pressure.

The peripheral housing 32 includes the flange section 32c on its surface opposed to the hub member 28. The flange section 32c extends outward in the radial direction of the hub member 28. The thrust dynamic pressure groove SB is formed in at least one of the opposed surfaces of the flange section 32c and the hub member 28. The thrust dynamic pressure groove SB is for generating a dynamic pressure that receives a load in the axial direction of the shaft 38. The lubricant 48 is also charged into a gap opening along the axial direction of the shaft 38 between the opposed surfaces of the flange section 32c and the hub member 28. The thrust fluid dynamic bearing unit including this thrust dynamic pressure groove SB is in communication with the radial fluid dynamic bearing unit including the radial dynamic pressure grooves RB1 and RB2. The thrust dynamic pressure groove SB is formed into a spiral shape or a herringbone shape for example and generates a pump-in dynamic pressure. Therefore, when the hub member 28 located on the side of the rotating body section R rotates with respect to the flange section 32c located on the side of the fixed body section S, the pump-in dynamic pressure is generated. With this dynamic pressure, force in the axial direction of the shaft 38 is applied to the hub member 28 of the rotating body section R. With this, a predetermined gap opens in the axial direction of the shaft 38 between the fixed body section S and the hub member 28. Therefore, the hub member 28 is supported by the fixed body section S substantially in the non-contact state.

In the case of this embodiment, the lubricant 48 charged into the gap of the radial fluid dynamic bearing unit and the gap of the thrust fluid dynamic bearing unit is commonly used. The lubricant 48 is sealed by a capillary seal TS, and this prevents the lubricant 48 from leaking outside from the charged position. The capillary seal TS includes the outer wall surface 32d of the peripheral housing 32 and an inner wall surface 42a of the thrust ring 42. The outer wall surface 32d of the peripheral housing 32 is formed into an inclined surface whose diameter is reduced from its upper portion toward its lower portion. The inner wall surface 42a of the thrust ring 42 opposed to the outer wall surface 32d is also formed into an inclined surface whose diameter is reduced toward its lower tip end that is on the opening side. Since an inclination angle of the outer wall surface 32d of the peripheral housing 32 is greater than an inclination angle of the inner wall surface 42a of the thrust ring 42, a gap formed therebetween forms the capillary seal TS that widens toward the opening side. An amount of the lubricant 48 to be charged is set such that a boundary plane (liquid plane) where the lubricant 48 is in contact with outside air is located in the middle of the capillary seal TS. Therefore, the lubricant 48 is sealed by the capillary seal TS due to the capillary action, and the lubricant 48 is prevented from leaking out from the charged position. The outer wall surface 32d of the peripheral housing 32 in the capillary seal TS is an inclined surface whose diameter is reduced from its upper portion toward its lower portion. Therefore, as the rotating body section R rotates, centrifugal force in a direction moving the lubricant 48 inward of a portion where the lubricant 48 is charged is applied to the lubricant 48. That is, the lubricant 48 receives force acting toward the thrust fluid dynamic bearing unit. Thus, lubricant 48 is more reliably prevented from leaking outside.

Circulation paths 50a and 50b are formed in the inner wall surface of the peripheral housing 32. The lubricant 48 circulates in a direction along an axis of the sleeve 34 through the circulation paths 50a and 50b. When the sleeve 34 is fitted into the peripheral housing 32, the circulation paths 50a and 50b function as communication holes that connect both end surfaces of the peripheral housing 32 with each other. As a result, both the radial dynamic pressure groove RB1 and the radial dynamic pressure groove RB2 are brought into communication with each other, the lubricant 48 circulates, and a pressure balance is excellently maintained. It is preferable that the circulation paths 50a and 50b have arc cross sections in terms of workability, but the shapes are not limited to the arc shapes. FIG. 2 shows an example in which the two circulation paths 50a and 50b are formed. It is preferable that the number of circulation paths is appropriately selected while taking the circulation efficiency of lubricant 48 into account.

Foreign matters such as abrasion powder of a bearing constituent member and fragments of the bearing constituent member float in the lubricant 48 in some cases. As described above, when the shaft 38 is in a resting state, the shaft 38 and the sleeve 34 are in contact with each other. When rotation of the shaft 38 is restarted from this state, the shaft 38 and the sleeve 34 slide on each other at an initial stage of the rotation. As a result, there is an adverse possibility that abrasion powder or fragments of the constituent member are generated due to the sliding action. When the foreign matters exist in the lubricant 48, the foreign matters may block the circulation path for the lubricant 48 or accelerate wearing of the bearing constituent member. The foreign matters may cause uneven rotation or rotation failure of the shaft 38. Further, the foreign matters can function as abrasives and accelerate the generation of the abrasion powder and fragments in some cases. Hence, in this embodiment, a porous filter 52 made of cylindrical porous material is disposed within the circulation path 50a. The porous filter 52 captures foreign matters floating in the lubricant 48 by circulation of the lubricant 48.

Materials of the porous filter 52 may appropriately be selected from sintered metal, mesh material such as fiber, and material that encloses fine particles and adsorbs foreign matters on its surface. It is preferable to use nonwoven fabric of resin, especially melt blown nonwoven fabric formed of polypropylene-based resin as raw resin. This is because that since the fiber diameter is small, a gap between fibers is narrow and barrier performance is excellent. It is preferable that the material of the porous filter 52 is not physically or chemically varied when it is immersed in the lubricant 48.

Figure 3:
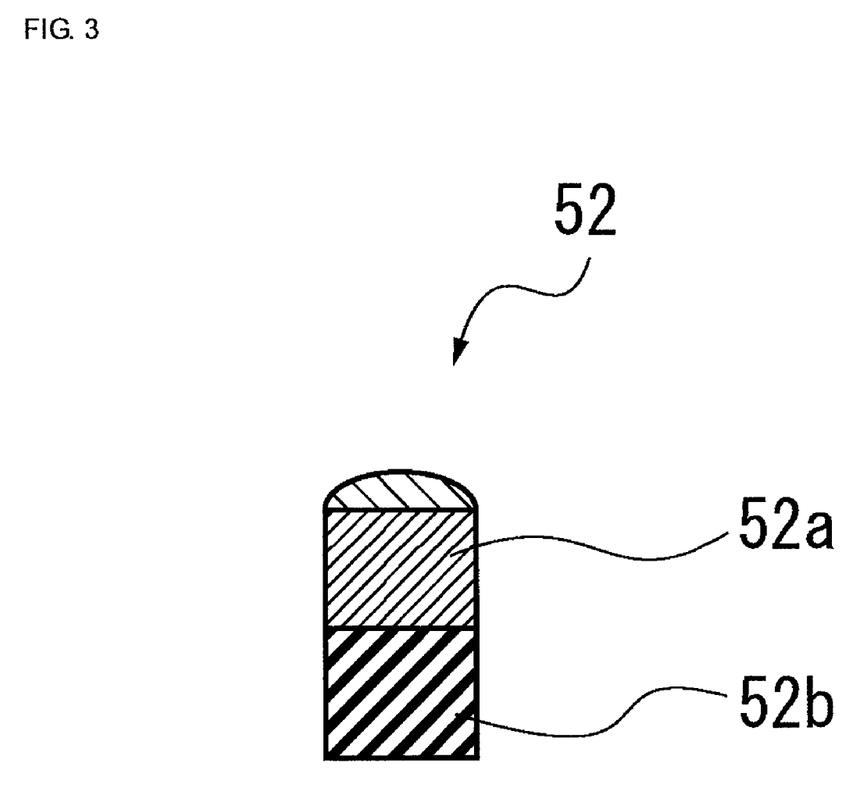
FIG. 3 is a cross sectional view of a cylindrical porous filter used for the disk drive device of the embodiment taken along an axial direction of the porous filter.

It is preferable that the porous structure of the porous filter 52 has density of the filter that is changed from a rough state to a dense state so that the porous filter 52 can capture foreign matter contained in the lubricant 48 moving in its moving direction. FIG. 3 is a cross sectional view taken along the axial direction of the porous filter 52. FIG. 3 shows the porous filter 52 having a rough/dense double structure. That is, the porous filter 52 includes a first layer portion 52a and a second layer portion 52b. The first layer portion 52a has relatively rough filter density located upstream in the moving direction of foreign matters in the lubricant 48. The second layer portion 52b has relatively dense filter density located downstream in the moving direction of foreign matters. Foreign matters floating in the lubricant 48 have various sizes. For example, if hole diameters of the entire porous structure are made large in correspondence with a size of the maximum foreign matters, small foreign matters cannot be captured. If the hole diameters of the entire porous structure are made small in correspondence with a size of the minimum foreign matters, all of foreign matters are captured at a location of the filter close to its surface and the filter is clogged at an early stage. For this reason, as shown in FIG. 3, the density of the porous structure of the first layer portion 52a close to the inflow side of the lubricant 48 is made relatively rough, and the density of the porous structure of the second layer portion 52b close to the outflow side of the lubricant 48 is made relatively dense. As a result, foreign matters captured by the porous filter 52 are captured at different locations in accordance with their sizes. With this, not only around the inflow side surface of the porous filter 52 but also the entire filter 52 effectively exhibit the capturing function. Therefore, the porous filter 52 can be less prone to be clogged.

The present inventors obtained, through experiments, a result that sizes of foreign matters floating in the lubricant 48 of the disk drive device could be classified into small foreign matters of less than about 0.3 μm, intermediate foreign matters of 0.3 to 1.0 μm, and large foreign matters of greater than 1.0 μm. From downsizing requirement of disk drive devices, the inventors obtained a result that even if a gap of the radial fluid dynamic bearing unit was as narrow as 2 to 4 μm, a problem did not easily occur even if the small foreign matters of less than 0.3 μm entered the bearing gap. Therefore, it is preferable to efficiently capture the intermediate foreign matters and the large foreign matters. As described above, if the hole diameters of the entire porous structure are set to about 0.3 µm, most of foreign matters are captured at a location of the porous filter 52 close to its surface and the filter is clogged at an early stage. Hence, the hole diameters of the porous structure of the first layer portion 52a close to the surface are set to 0.5 to 1.0 µm for example, the small foreign matters and the intermediate foreign matters pass through this portion, and only the large foreign matters are captured by this portion and accumulated. Thus, if the hole diameters of the porous structure of the second layer portion 52b located at the downstream side of the lubricant 48 are set to 0.3 to 0.5 µm, the intermediate foreign matters are captured there. As a result, foreign matters can be captured using the entire porous filter 52. With this, the entire region of the filter can effectively function and thus, the lifetime of the porous filter 52 until the filter is clogged and its function is deteriorated can be increased. The porous structure of the porous filter 52 is not limited to the two-layer structure, and may be of a multi-layer structure having three or more layers. The porous structure can be designed such that diameters of the holes are continuously varied. In any of these structures, it is possible to increase the lifetime of the filter and to excellently remove foreign matters.

The lubricant 48 flows from a lower side of the circulation path 50a in this embodiment shown in FIG. 2, and flows out toward the hub member 28. Therefore, the lower side of the porous filter 52 becomes the first layer portion 52a and the upper side of the porous filter 52 becomes the second layer portion 52b. A material and a shape of the porous filter 52 can appropriately be changed, and the same effect can be obtained. A position where the porous filter 52 is disposed is not limited to the above example, and the position can appropriately be selected as far as the lubricant 48 can flow, and the same effect can be obtained.

In the capillary seal TS, the lubricant 48 and air are in contact with each other. Therefore, foreign matters floating in the air enter the lubricant 48 in some cases. Therefore, in this embodiment, a cap ring 54 is disposed outside of the open end of the capillary seal TS as shown in FIG. 2. The cap ring 54 functions as a cover member that covers at least a portion of the open end. By disposing the cap ring 54, contact between the lubricant 48 and air is limited. Thus, the possibility that foreign matters enter the lubricant 48 can be reduced.

Conventionally, stainless steel SUS420J2 is employed as base metal of the shaft 38. Further, high-tensile brass C6782 is employed as base material of the sleeve 34. Coefficients of liner expansion of these base metals are $10.3 \times 10^{-6}/C.°$ and $16.5 \times 10^{-6}/C.°$. As a result, when the temperature of the fluid dynamic bearing unit becomes low, the radial space becomes narrow in some cases. If the radial space becomes narrow, the bearing unit is prone to be clogged with foreign matters. Thus, the rotational accuracy is prone to be deteriorated and the member surface is prone to be worn. Hence, in this embodiment, at least an inner peripheral surface of the sleeve 34 and at least an outer peripheral surface of the shaft 38 are covered with material having lower coefficient of linear expansion than that of the high-tensile brass and having high wear resistance (e.g., SIALON ceramic). The SIALON ceramic can be obtained by replacing a portion of Si in silicon nitride ceramic ($Si_3N_4$) with Al and by replacing a portion of N with O. Especially β-SIALON ceramic expressed by a chemical formula $Si_{6-z}Al_zO_zN_{8-z}$ (Z=0 to 4.2) has excellent workability, small coefficient of linear expansion of about $3.5 \times 10^{-6}/C.°$, and high wear resistance. As a result, β-SIALON ceramic does not easily receive an influence of thermal deformation caused by variation in peripheral temperature. Therefore, when β-SIALON ceramic is used, narrowing tendency of a gap can be suppressed and thus, it is possible to prevent foreign matters from being caught in a gap, and since the wear resistance is enhanced, abrasion powder or fragments are not easily generated at the time of sliding motion in the initial stage of rotation. Similarly, if at least a surface of the flange section 32c of the peripheral housing 32 and at least a surface portion of the hub member 28 opposed to the flange section 32c are made of SIALON ceramic or the like, the same effect can be obtained.

As described above, if at least the inner peripheral surface of the sleeve 34 and at least the outer peripheral surface of the shaft 38 are made of SIALON ceramic, the narrowing tendency of the gap caused by thermal deformation can be suppressed. Thus, it is possible to suppress the hitch of foreign matters with respect to the gap and to suppress generation of foreign matters from the gap. As a result, also in a fluid dynamic bearing unit having no porous filter 52 shown in FIG. 2, inconvenience caused by foreign matters can be reduced. Therefore, this configuration can contribute to the narrowing of the flow path width of lubricant when a fluid dynamic bearing unit is designed. That is, this feature can reduce the disk drive device in size.

In the example in FIG. 2, the porous filter 52 is disposed only in the circulation path 50a. The porous filter 52 may be disposed in the circulation path 50b instead. Two circulation paths may be provided, and the porous filters 52 may be disposed in the paths. By disposing a plurality of porous filters 52 in this manner, the capturing ability of foreign matters is enhanced. On the other hand, flowing efficiency of lubricant 48 may be deteriorated. Therefore, it is preferable that the number of porous filters 52 to be disposed is appropriately determined through experiments in accordance with characteristics such as a mixing degree of foreign matters into the fluid dynamic bearing unit such that the balance between the capturing efficiency and the flowing efficiency becomes excellent.

Figure 4:
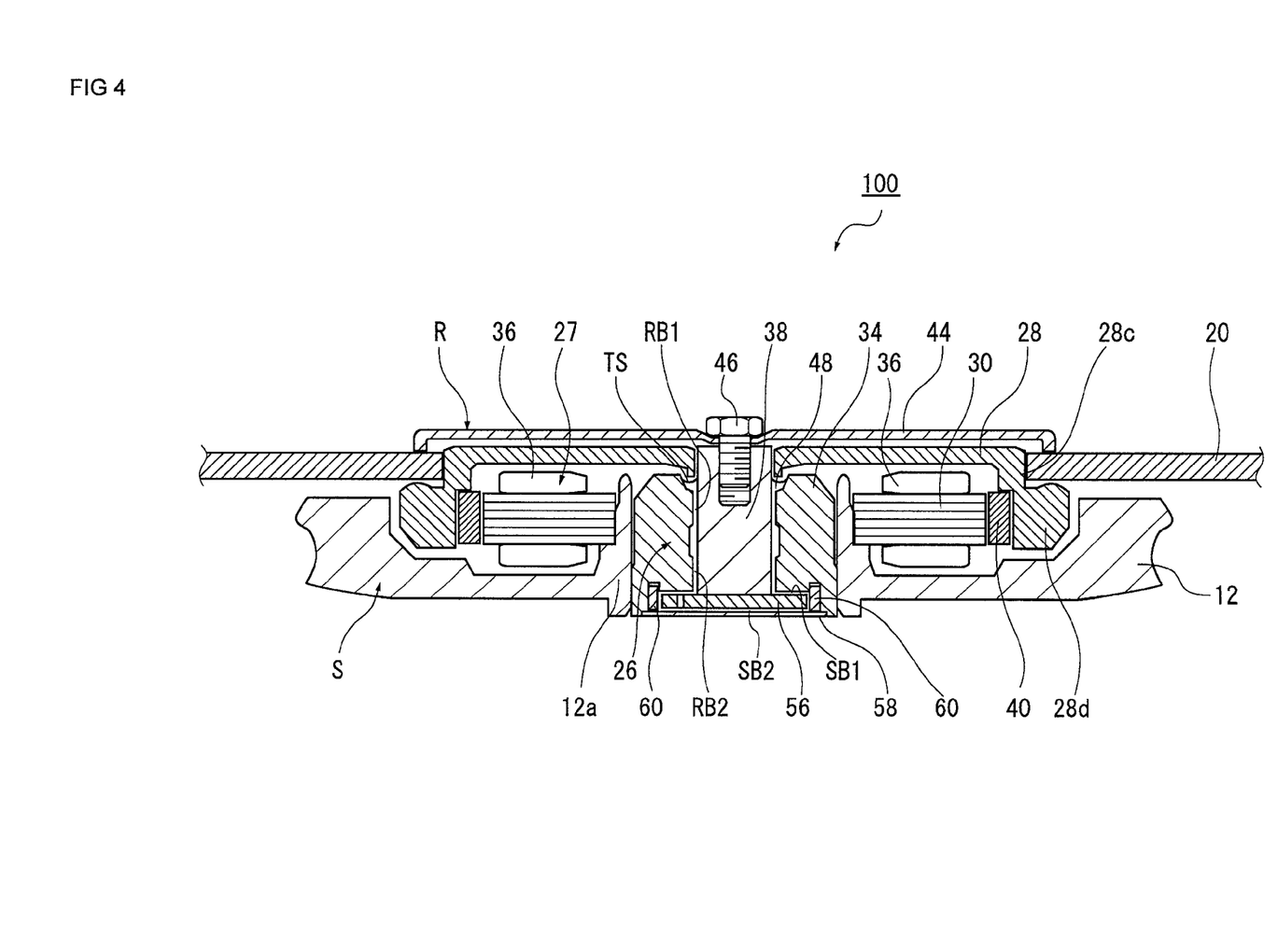
FIG. 4 is an explanatory diagram for explaining details of a fixed body section, a rotating body section, a bearing unit and a drive unit of a disk drive device having a different structure from that of the disk drive device shown in FIG. 2.

FIG. 4 shows a structure of a disk drive device 100 having a structure different from that of the disk drive device 10 shown in FIG. 2. Driving principles of the disk drive device 100 shown in FIG. 4 and the disk drive device 10 shown in FIG. 2 are the same. Thus, in the disk drive device 100, substantially the same structures and members having the same functions are designated with the same symbols as in the disk drive device 10, and explanation of partial members will be omitted. The disk drive device 100 is also a shaft-rotation type disk drive device like the disk drive device 10.

The disk drive device 100 includes the fixed body section S, the rotating body section R, the bearing unit 26 and the drive unit 27. The bearing unit 26 includes the radial fluid dynamic bearing unit having the radial dynamic pressure grooves RB1 and RB2 and the lubricant 48, and the thrust fluid dynamic bearing unit having thrust dynamic pressure grooves SB1 and SB2. The drive unit 27 rotationally drives the rotating body section R with respect to the fixed body section S through these fluid dynamic bearing units.

The fixed body section S includes the base member 12, the stator core 30, the coils 36, the sleeve 34 and a counter plate 58. The rotating body section R includes the hub member 28, the shaft 38, the magnet 40 and a flange 56. The bearing unit 26 includes the shaft 38, the flange 56, the sleeve 34 and the counter plate 58. The drive unit 27 includes the stator core 30, the coils 36 and the magnet 40.

The disk drive device 100 shown in FIG. 4 includes the outwardly extending portion 28d that outwardly extends to the lower end of the outer peripheral cylindrical portion 28c of the hub member 28. The outwardly extending portion 28d has a surface on which the recording disk 20 is placed, and this surface is set higher than a position of an upper end surface of the magnet 40 in the axial direction. The hub member 28 is made of magnetic material. An outer diameter of the magnet 40 is smaller than an inner diameter of the recording disk 20. The upper surface of the magnet 40 is set smaller than the height of the outwardly extending portion 28*d* in the axial direction. This structure can reduce the thickness of the disk drive device 100. In the embodiment, a portion of the outwardly extending portion 28*d* of the hub member 28 that becomes a back yoke of the magnet 40 is made thick. As a result, even if material having high residual flux density is employed for the magnet 40, a magnetic flux of the back yoke is not saturated. With this, magnetic flux leaking to the recording disk 20 can be reduced.

The sleeve 34 is directly fixed to an inner wall surface of a cylindrical portion 12*a* of the base member 12 by adhesive or the like. A radial fluid dynamic bearing unit including the radial dynamic pressure grooves RB1 and RB2 and the lubricant 48 is formed on at least one of the inner wall surface of the sleeve 34 and the outer wall surface of the shaft 38. The flange 56 that rotates in unison with the shaft 38 is fixed to a lower end of the shaft 38. A flange-accommodating space in which the flange 56 is rotatably accommodated is formed in a central portion of a lower surface of the sleeve 34. One end of the flange-accommodating space is sealed by the counter plate 58. With this, hermeticity of the flange-accommodating space and an accommodating space for the shaft 38 communicating with the former space can be maintained.

The thrust dynamic pressure groove SB1 is formed in at least one of a surface of the flange 56 and a surface of the sleeve 34 that are opposed to each other in the axial direction. The thrust dynamic pressure groove SB2 is formed in at least one of a surface of the flange 56 and a surface of the counter plate 58 that are opposed to each other. The thrust dynamic pressure grooves SB1 and SB2 form the thrust fluid dynamic bearing unit in cooperation with the lubricant 48. It is preferable that at least the surface of the sleeve 34 that forms the flange-accommodating space and at least the surface of the flange 56 are covered with material (SIALON ceramic or the like) having small coefficient of linear expansion and high wear resistance. Similarly, it is preferable that at least an inner peripheral surface of the sleeve 34 and at least an outer peripheral surface of the shaft 38 are made of SIALON ceramic or the like. By making these portions of SIALON ceramic, it is possible to avoid a case where a gap becomes narrow due to thermal deformation caused by temperature variation. Further, since the wear resistance is enhanced, it is possible to suppress generation of abrasion powder and fragments caused by contact.

The capillary seal TS is formed between the outer peripheral surface of the shaft 38 and an opposed surface of the opened portion of the sleeve 34. The space where the capillary seal TS is formed is in communication with a radial space where the radial fluid dynamic bearing unit is formed and the flange-accommodating space. The lubricant 48 is charged into the radial space, the flange-accommodating space and the capillary seal TS. They constitute the bearing unit 26. That is, the hub member 28 is rotatably supported with respect to the base member 12 through the bearing unit 26.

According to this structure also, a porous member is disposed in the path for the lubricant 48 to capture foreign matters floating in the lubricant 48. More specifically, a porous filter 60 that is the porous member is disposed at a portion of the sleeve 34 closer to the outer periphery of the flange 56 such as to surround the flange 56. An outline structure of the porous filter 60 will be described in reference to the cross sectional view in FIG. 5. Like the porous filter 52 shown in FIG. 3, it is preferable that the porous filter 60 has a rough/dense double structure.

Figure 5:
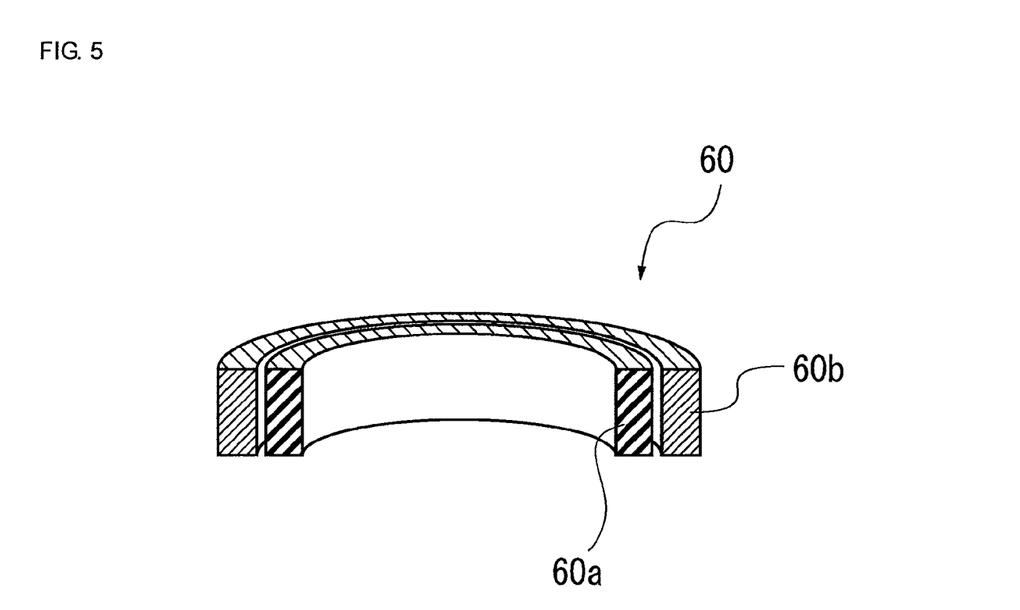
FIG. 5 is a cross sectional view of a ring-like porous filter used for the disk drive device shown in FIG. 4 taken along an axial direction of the porous filter.

As described above, the flange 56 rotates in unison with the shaft 38. Thus, as the flange 56 rotates, centrifugal force is applied to the lubricant 48. However, in the case of FIG. 4, the flange 56 is surrounded by the flange-accommodating space. Therefore, large flow of the lubricant 48 itself is not generated. However, foreign matters such as metal powder contained in the lubricant 48 have greater specific gravity than the lubricant 48. Therefore, foreign matters receive centrifugal force for moving radially outward of the flange 56. That is, foreign matters move toward the porous filter 60 that surrounds the flange 56. Hence, the porous filter 60 is formed into a ring-shape, density of the porous material of its inner portion 60*a* (first layer portion) is relatively rough and density of the porous material of its outer portion 60*b* (second layer portion) is relatively dense. As described above, sizes of foreign matters floating in the lubricant 48 of the disk drive device can be classified into small foreign matters of less than about 0.3 μm, intermediate foreign matters of 0.3 to 1.0 μm, and large foreign matters of greater than 1.0 μm. Therefore, the density of the porous material of the inner portion 60*a* of the porous filter 60 is adjusted to relatively rough. With this, only the large foreign matters exceeding 1.0 μm are captured. The density of the porous material of the outer portion 60*b* is adjusted to relatively dense as compared with the inner portion 60*a*. With this, the intermediate foreign matters of 0.3 to 1.0 μm that passed through the inner portion 60*a* can be captured. As described above, concerning the fluid dynamic bearing unit whose path for lubricant 48 was narrowed in the designing stage, even if small foreign matters of less than 0.3 μm exist in the lubricant 48, the small foreign matters are not caught in the flow path and no inconvenience occurs. Thus, such foreign matters pass through the porous filter 60. By forming the porous filter 60 into the rough/dense structure, it is possible to capture foreign matters using the entire porous filter 60. With this, the capturing function of the entire filter can effectively be exhibited, and the lifetime of the porous filter 60 until the filter is clogged and its function is deteriorated can be increased. The inner portion 60*a* and the outer portion 60*b* of the porous filter 60 may be integrally formed, or the inner portion 60*a* and the outer portion 60*b* may be independent members. If the inner portion 60*a* and the outer portion 60*b* are independent members, it is possible to easily combine porous characteristics of the porous filter 60 in accordance with characteristics of the fluid dynamic bearing unit. Thus, it is possible to eliminate foreign matters in accordance with characteristics of foreign matters floating in the lubricant 48. Further, the inner portion 60*a* and the outer portion 60*b* may be in intimate contact with each other. Alternatively, a gap may be provided therebetween. In any of these structures, the same effect can be obtained. The porous structure of the porous filter 60 is not limited to the two-layer structure, and may be of a multi-layer structure having three or more layers. The porous structure can be designed such that diameters of the holes are continuously varied. In any of these structures, it is possible to increase the lifetime of the filter and to excellently remove foreign matters.

Figure 6:
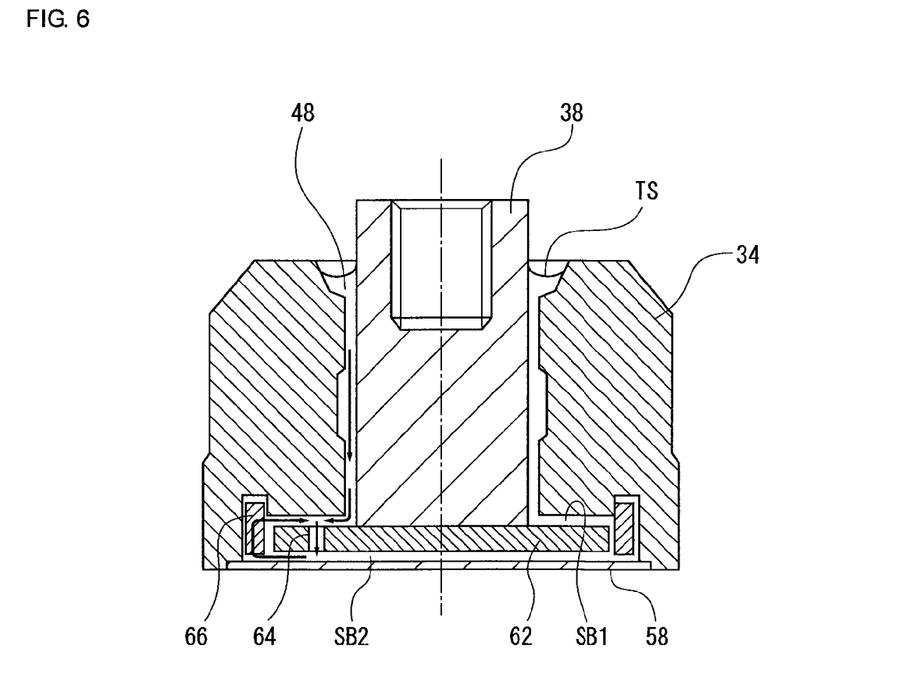
FIG. 6 is an explanatory diagram showing a modification of a flange of the disk drive device shown in FIG. 4, and is an enlarged cross sectional view of a peripheral portion of the flange.

FIG. 6 is an explanatory diagram showing a modification of the flange 56 of the disk drive device 100 shown in FIG. 4, and is an enlarged cross sectional view of peripheries of the flange. In FIG. 6, since structures other than the flange 62 are the same as those shown in FIG. 4, explanation thereof will be omitted. The flange 62 includes a circulation path 64 penetrating between a front surface and back surface of the flange 62. The lubricant 48 circulates through the circulation path 64 between the thrust fluid dynamic bearing units formed on the front surface and the back surface of the flange 62. A porous filter 66 that is a ring-like porous member is disposed such as to surround the flange 62.

According to the radial fluid dynamic bearing unit, to prevent the lubricant 48 from leaking from the capillary seal TS, a pressure is applied to the thrust fluid dynamic bearing unit from the capillary seal TS. In the thrust fluid dynamic bearing unit, when dynamic pressures generated on the front and back of the flange 62 are the same, flow of the lubricant 48 through the circulation path 64 is not generated. However, when a dynamic pressure generated on the side where the thrust dynamic pressure groove SB1 is formed is greater than a dynamic pressure generated on the side where the thrust dynamic pressure groove SB2 is formed, the lubricant 48 flows from the side where the thrust dynamic pressure groove SB1 is formed toward the side where the thrust dynamic pressure groove SB2 is formed through the circulation path 64 as shown with arrows in FIG. 6. According to the structure in FIG. 6, foreign matters contained in the lubricant 48 are captured by the porous filter 66 utilizing the flow of the lubricant 48.

Figure 7:
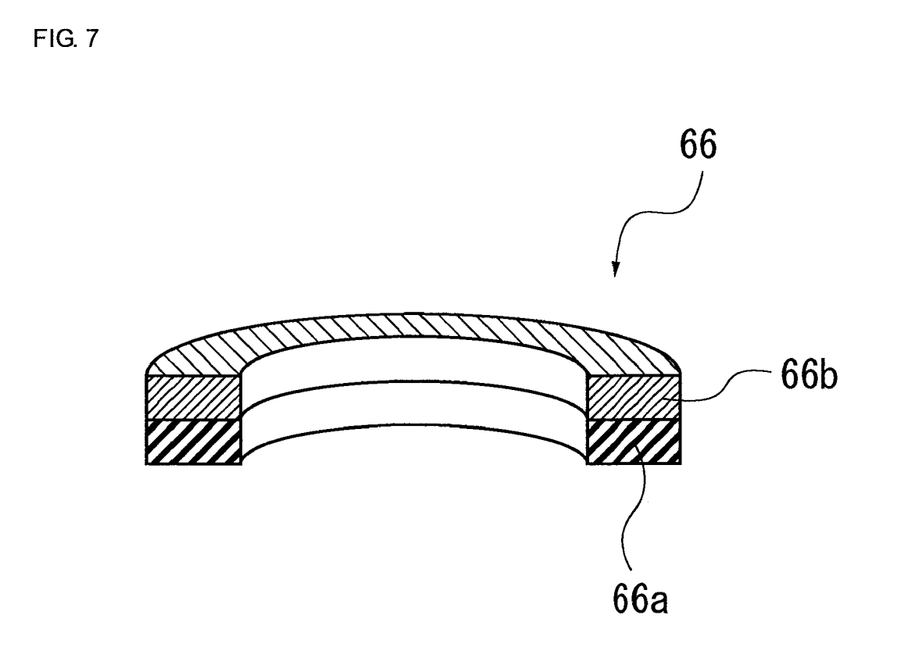
FIG. 7 is a cross sectional view of the ring-like porous filter used for the disk drive device having the flange shown in FIG. 6 taken along an axial direction of the porous filter.

The structure of the porous filter 66 used when the lubricant 48 flows as shown in FIG. 6 is shown in FIG. 7. It is preferable that the porous filter 66 has a rough/dense double structure. According to this porous filter 66, density of the porous material of an inflow side 66a (first layer portion) of the lubricant 48 is relatively rough, and density of porous material of the outflow side 66b (second layer portion) is relatively dense. A concrete rough/dense degree is the same as each of the above-described porous filters. That is, it is preferable to adjust the density of the porous material so that the inflow side 66a captures the large foreign matters exceeding 1.0 μm and the outflow side 66b captures the intermediate foreign matters of 0.3 to 1.0 μm. As a result, foreign matters can be captured using the entire porous filter 66. With this, the capturing function of the entire filter can effectively be exhibited, and the lifetime of the porous filter 66 until the filter is clogged and its function is deteriorated can be increased.

The inflow side 66a and the outflow side 66b of the porous filter 66 may be integrally formed, or the inflow side 66a and the outflow side 66b may be independent members. If the inflow side 66a and the outflow side 66b are independent members, it is possible to easily combine porous characteristics of the porous filter 66 in accordance with characteristics of the fluid dynamic bearing unit. Thus, it is possible to eliminate foreign matters in accordance with characteristics of foreign matters floating in the lubricant 48. Further, the inflow side 66a and the outflow side 66b may be in intimate contact with each other. Alternatively, a gap may be provided therebetween. In any of these structures, the same effect can be obtained. The porous structure of the porous filter 66 is not limited to the two-layer structure, and may be of a multi-layer structure having three or more layers. The porous structure can be designed such that diameters of the holes are continuously varied. In any of these structures, it is possible to increase the lifetime of the filter and to excellently remove foreign matters. When a dynamic pressure generated on the side where the thrust dynamic pressure groove SB2 is formed is greater than a dynamic pressure generated on the side where the thrust dynamic pressure groove SB1 is formed, the lubricant 48 flows through the circulation path 64 in the opposite direction from that shown in FIG. 6. In this case, the rough/dense structure of the porous filter 66 is reversed in accordance with the flow of the lubricant 48. It is preferable that the number of circulation paths is appropriately selected through experiments while taking the circulation efficiency of lubricant 48 into account, and while taking a balance between a dynamic pressure on the side where the thrust dynamic pressure groove SB1 is formed and a dynamic pressure on the side where the thrust dynamic pressure groove SB2 is formed into account.

Figure 8:
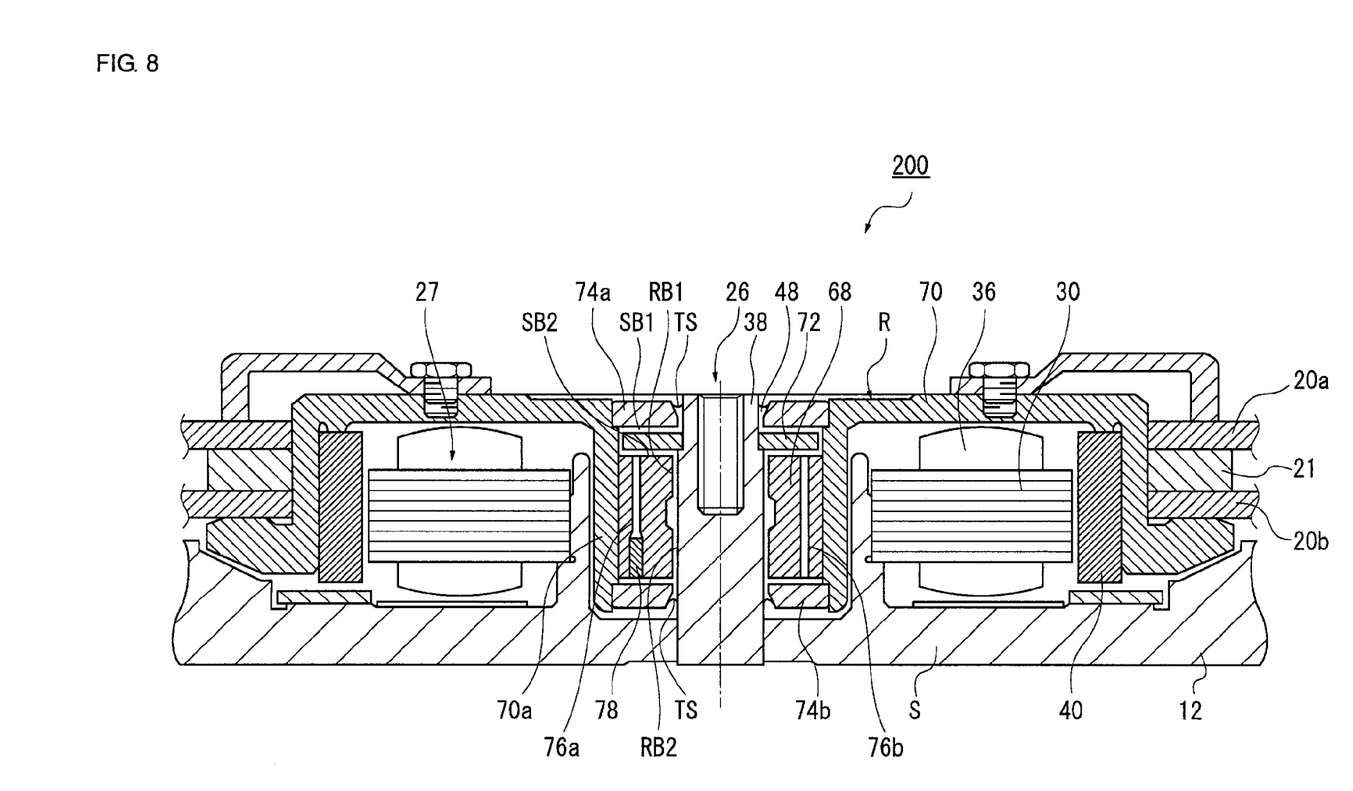
FIG. 8 is an explanatory diagram for explaining details of a fixed body section, a rotating body section, a bearing unit and a drive unit of a disk drive device having another structure of the embodiment.

FIG. 8 shows a disk drive device 200 having a structure different from those of the disk drive devices 10 and 100. In the disk drive device 200 shown in FIG. 8, the shaft 38 is fixed to the base member 12 and the sleeve 68 is fixed to a hub member 70. That is, the disk drive device 200 is of a so-called shaft-fixed type. A driving principle itself of the disk drive device 200 is the same as those of the disk drive devices 10 and 100. Therefore, in the disk drive device 200, substantially the same structures and members having the same functions as those of the disk drive devices 10 and 100 are designated with the same symbols, and explanation of partial members will be omitted.

The disk drive device 200 also includes the fixed body section S, the rotating body section R, the bearing unit 26 and the drive unit 27. The bearing unit 26 includes a radial fluid dynamic bearing unit having radial dynamic pressure grooves RB1 and RB2, the lubricant 48, and a thrust fluid dynamic bearing unit having thrust dynamic pressure grooves SB1 and SB2. The drive unit 27 rotationally drives the rotating body section R with respect to the fixed body section S through these fluid dynamic bearing units.

The fixed body section S includes the base member 12, the stator core 30, the coils 36, the shaft 38 and a flange 72. The rotating body section R includes the hub member 70, the magnet 40, the sleeve 68 and the seal rings 74a and 74b. The bearing unit 26 includes the shaft 38, the sleeve 68, the flange 72 and the seal rings 74a and 74b. The drive unit 27 includes the stator core 30, the coils 36 and the magnet 40.

In this structure, the inner peripheral surface of the sleeve 68 and the outer peripheral surface of the shaft 38 form a radial space. The radial dynamic pressure grooves RB1 and RB2 are formed in at least one of opposed surfaces thereof. The radial dynamic pressure grooves RB1 and RB2 form the radial fluid dynamic bearing unit together with the lubricant 48. The flange 72 is fixed to one end of the shaft 38. In an inner cylindrical portion 70a of the hub member 70, the seal rings 74a and 74b are fixed to both ends of the inner cylindrical portion 70a, and the flange 72 and the sleeve 68 are accommodated therebetween. The seal ring 74a and the flange 72 that is opposed to the seal ring 74a form a thrust space. The flange 72 and the sleeve 68 that is opposed to the flange 72 form another thrust space. The herringbone or spiral thrust dynamic pressure groove SB1 is formed in at least one of the seal ring 74a and the flange 72 that is opposed to the seal ring 74a. The thrust dynamic pressure groove SB2 is formed in at least one of the flange 72 and the sleeve 68 that is opposed to the flange 72.

A capillary seal TS is formed between opposed surfaces of the seal ring 74a and the shaft 38. The space where the capillary seal TS is formed is in communication with the radial space. The lubricant 48 is charged into the radial space, the thrust space and the capillary seal TS. These spaces and the lubricant 48 constitute the bearing unit 26 including the radial fluid dynamic bearing unit and the thrust fluid dynamic bearing unit. Therefore, the hub member 70 is supported through the bearing unit 26 such that the hub member 70 can rotate around the shaft 38 that is fixed to the base member 12.

Figure 9:
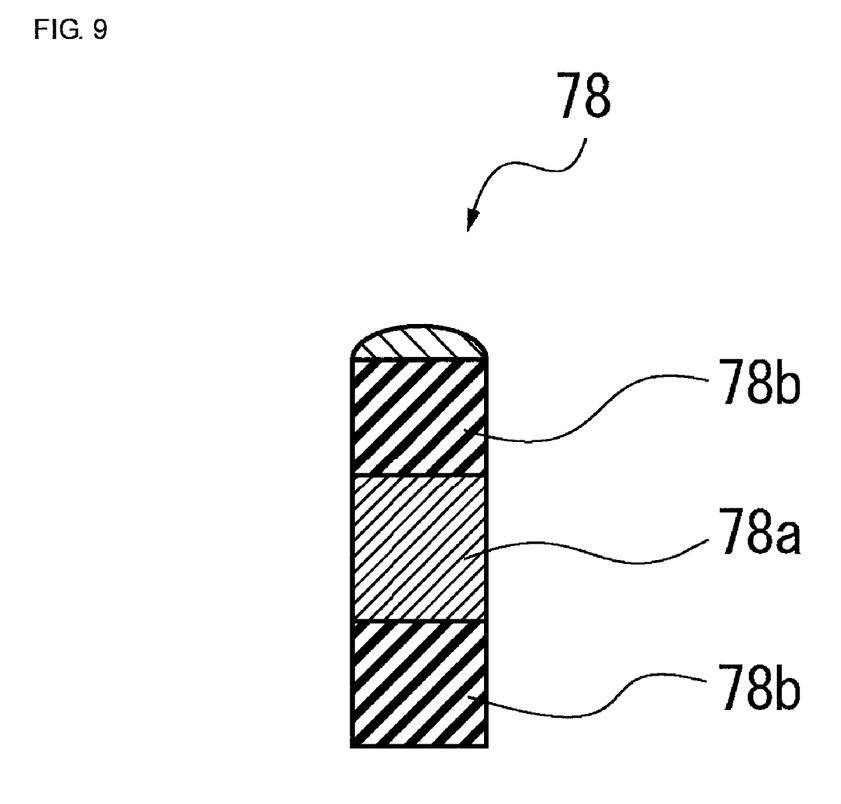
FIG. 9 is a cross sectional view showing one example of a porous filter that can be utilized in the disk drive device shown in FIG. 8.

Circulation paths 76a and 76b are formed in the disk drive device 200 shown in FIG. 8 such as to penetrate both ends of the sleeve 68 in its axial direction. The circulation paths 76a and 76b function as communication paths for the lubricant 48. A cylindrical porous filter 78 as a porous member as shown in FIG. 9 is disposed within the circulation path 76a. The porous filter 78 captures foreign matters floating in the circulating lubricant 48. It is preferable that the porous filter 78 has a multi-layer structure like the porous filters 52, 60 and 66. FIG. 9 is a cross sectional view showing one example of the porous filter 78 that can be utilized in the structure shown in FIG. 8. The porous filter 78 in FIG. 9 has a structure in which rough portions of the porous material sandwich a dense portion of the porous member. That is, density of the porous member of an intermediate portion 78a (second layer portion) of the porous filter 78 is relatively dense, and densities of porous member on both ends 78b (first layer portions) are relatively rough. The density of the porous member is adjusted such that most of small foreign matters less than 0.3 μm can pass through the porous filter 78, the intermediate portion 78a having high density of porous member captures the intermediate foreign matters of 0.3 to 1.0 μm, and the ends 78b having relatively rough density of porous member capture the large foreign matters exceeding 1.0 μm. As a result, foreign matters can be captured using the entire porous filter 78. With this, the capturing function of the entire filter can effectively be exhibited, and the lifetime of the porous filter 78 until the filter is clogged and its function is deteriorated can be increased. The porous structure of the porous filter 78 may have three or more porous structures as long as the density of the center porous member is dense and porous members on the ends are rough. As the number of layers is increased, clogging-suppressing function of foreign matters is enhanced. The porous structure can be designed such that diameters of the holes of the porous member are continuously varied. In any of these structures, it is possible to increase the lifetime of the filter and to excellently remove foreign matters. No matter which end the lubricant 48 flows in, the outer side of the porous filter 78 in FIG. 9 captures the large foreign matters and the center thereof captures the intermediate foreign matters. Therefore, even if the pressure balance in the flow path of the lubricant 48 is varied and the flowing direction is changed, it is possible to appropriately capture the foreign matters and the clogging of the filter can be delayed. With this, lifetime of the porous filter 78 in FIG. 9 can be increased. The porous filter 52 of two layers in FIG. 3 can be utilized in the disk drive device 200. This structure also exhibits the same foreign matter-removing ability. Similarly, even if the porous filter 78 in FIG. 9 is used in the disk drive device 10 in FIG. 2, excellent foreign matter-removing ability can be exhibited.

The both ends 78b and the intermediate portion 78a of the porous filter 78 are not limited to the integral structure. Even if they are independent from each other or gaps are formed therebetween, the same foreign matter-removing ability can be exhibited. In this case also, it is preferable that at least the outer peripheral surface of the shaft 38 and at least the inner peripheral surface of the sleeve 68 are made of material having small coefficient of linear expansion and high wear resistance (SIALON ceramic or the like). It is preferable that at least a surface of the flange 72 and at least a surface of a member that is opposed to the flange 72 are made of SIALON ceramic or the like. If these surfaces are made of ceramic, it is possible to prevent the gap from narrowing due to thermal deformation caused by temperature variation. Further, since the wear resistance is enhanced, it is possible to suppress generation of abrasion powder and fragments caused by contact.

FIG. 8 shows an example where the porous filter 78 is disposed only in the circulation path 76a. However, the porous filter 78 may also be disposed on the side of the circulation path 76b. A plurality of circulation paths may be provided and the porous filters 78 may be disposed in these circulation paths. If the plurality of porous filters 78 are disposed, the foreign matters capturing ability is enhanced. However, the flowing efficiency of the lubricant 48 may be deteriorated in some cases. Therefore, it is preferable that the number of porous filters 78 is appropriately determined through experiments in accordance with characteristics of a foreign matter-mixing degree of the fluid dynamic bearing unit such that the balance between the capturing efficiency and the flowing efficiency becomes excellent.

It is possible to express the present invention as first to twentieth disk drive devices. That is, a disk drive device according to a first aspect includes a base member, a bearing unit that is disposed in the base member and that rotatably supports a recording disk with respect to the base member; and a drive unit that rotationally drives the recording disk supported by the bearing unit, the bearing unit includes: a shaft that is a center of rotation; a sleeve that has an accommodating portion in which the shaft is accommodated and that permits relative rotation around the shaft; a radial space defined by an inner wall surface of the accommodating portion of the sleeve and an outer wall surface of the shaft; a radial dynamic pressure groove that generates a radial dynamic pressure in at least one of the inner wall surface of the sleeve and the outer wall surface of the shaft that define the radial space; a lubricant charged into the radial space; and a porous member that is disposed in at least a portion of a charging space into which the lubricant is charged, thereby capturing a foreign matter contained in the lubricant.

According to a second aspect, in the disk drive device of the first aspect, the porous member is made of nonwoven fabric.

According to a third aspect, in the disk drive device of the first aspect, the porous member includes sintered metal.

According to a fourth aspect, in the disk drive device of the first aspect, the porous member is a filter of a multi-layer structure, and a density of the filter is varied from a rough state to a dense state in correspondence with a moving direction of a foreign matter contained in the lubricant.

According to a fifth aspect, in the disk drive device of the fourth aspect, the porous member includes at least a first layer and a second layer, the first layer allows a foreign matter having a size less than 0.5 μm to pass therethrough, whereas the first layer captures a foreign matter of a size of 1.0 μm or greater, and the second layer captures a foreign matter of a size of 0.3 μm or greater.

According to a sixth aspect, in the disk drive device of the first aspect, an end of the radial space is in communication with a capillary seal, and a cover member covering at least a portion of an opened end of the capillary seal is disposed outside the opened end.

According to a seventh aspect, in the disk drive device of the first aspect, at least an inner peripheral surface of the sleeve and at least an outer peripheral surface of the shaft are made of SIALON ceramic.

According to an eighth aspect, in the disk drive device of the first aspect, the sleeve includes a circulation path through which the lubricant circulates in a direction along a rotation shaft, and the porous member is disposed within the circulation path.

A disk drive device according to a ninth aspect includes: a base member, a bearing unit that is disposed in the base member and that rotatably supports a recording disk with respect to the base member; and a drive unit that rotationally drives the recording disk supported by the bearing unit, the bearing unit includes: a shaft that is a center of rotation; a sleeve that has an accommodating portion in which the shaft is accommodated and that permits relative rotation around the shaft; a flange that rotates in unison with the shaft; a flange-accommodating space that is provided in the sleeve and that rotatably accommodates the flange; a counter plate that is opposed to an end surface of the flange in its axial direction and that seals the flange-accommodating space; a thrust dynamic pressure groove that is formed in at least one of a surface of the flange-accommodating space opposed to the flange in a thrust direction and a surface of the counter plate opposed to the flange in the thrust direction, and that generates a thrust dynamic pressure; a lubricant charged into the flange-accommodating space; and a porous member that is disposed in at least a portion of a charging space into which the lubricant is charged, and that can capture a foreign matter contained in the lubricant.

According to a tenth aspect, in the disk drive device of the ninth aspect, the porous member is disposed at a portion of the sleeve close to an outer periphery of the flange such as to surround the flange.

According to an eleventh aspect, in the disk drive device of the ninth aspect, the porous member is made of nonwoven fabric.

According to a twelfth aspect, in the disk drive device of the ninth aspect, the porous member includes sintered metal.

According to a thirteenth aspect, in the disk drive device of the ninth aspect, the porous member is a filter of a multi-layer structure, and a density of the filter is varied from a rough state to a dense state in correspondence with a moving direction of a foreign matter contained in the lubricant.

According to a fourteenth aspect, in the disk drive device of the thirteenth aspect, the porous member includes at least a first layer and a second layer, the first layer allows a foreign matter having a size less than 0.5 µm to pass therethrough, whereas the first layer captures a foreign matter of a size of 1.0 µm or greater, and the second layer captures a foreign matter of a size of 0.3 µm or greater.

According to a fifteenth aspect, in the disk drive device of the ninth aspect, at least one of a wall surface of a thrust-accommodating space of the sleeve, an outer peripheral surface of the shaft and a surface of the flange is made of ceramic.

A disk drive device according to a sixteenth aspect includes: a base member, a bearing unit that is disposed in the base member and that rotatably supports a recording disk with respect to the base member; and a drive unit that rotationally drives the recording disk supported by the bearing unit, the bearing unit includes: a shaft that is fixed to the base member and that is a center of rotation; a sleeve that has an accommodating portion in which the shaft is accommodated and that permits relative rotation around the shaft; a radial space defined by an inner wall surface of the accommodating portion of the sleeve and an outer wall surface of the shaft; a radial dynamic pressure groove that generates a radial dynamic pressure in at least one of the inner wall surface of the sleeve and the outer wall surface of the shaft that define the radial space; a circulation path penetrating both ends of the sleeve in its axial direction; a lubricant charged into the radial space and the circulation path; and a porous member that is disposed within the circulation path and that can capture a foreign matter contained in the lubricant.

According to a seventeenth aspect, in the disk drive device of the sixteenth aspect, the porous member is made of non-woven fabric.

According to an eighteenth aspect, in the disk drive device of the sixteenth aspect, the porous member includes sintered metal.

According to a nineteenth aspect, in the disk drive device of the sixteenth aspect, the porous member is a filter of a multi-layer structure, and a density of the filter is varied from a rough state to a dense state in correspondence with a moving direction of a foreign matter contained in the lubricant.

According to a twentieth aspect, in the disk drive device of the sixteenth aspect, at least one of a wall surface of a thrust-accommodating space of the sleeve, an outer peripheral surface of the shaft and a surface of the flange is made of ceramic.

The present invention is not limited to the above embodiment, and can be variously modified in design or the like based on knowledge of a person skilled in the art. The structures shown in the drawings are for explaining one example, and as far as the same function can be achieved, the structure can appropriately be changed and the same effect can be obtained.

What is claimed is:

1. A disk drive device, comprising
a base member;
a bearing unit that is disposed in the base member and that rotatably supports a recording disk with respect to the base member; and
a drive unit configured to rotationally drive the recording disk supported by the bearing unit,
the bearing unit including:
a shaft that is a center of rotation;
a sleeve that has an accommodating portion in which the shaft is accommodated and that is configured to permit relative rotation around the shaft;
a radial space defined by an inner wall surface of the accommodating portion of the sleeve and an outer wall surface of the shaft;
a radial dynamic pressure groove configured to generate a radial dynamic pressure and formed in at least one of the inner wall surface of the sleeve and the outer wall surface of the shaft that define the radial space;
a lubricant charged into the radial space; and
a porous member that is disposed in at least a portion of a charging space into which the lubricant is charged, for capturing foreign matter contained in the lubricant;
wherein
the porous member is a filter of a multi-layer structure, and
a density of the filter is varied from a rough state to a dense state in correspondence with a moving direction of foreign matter contained in the lubricant.

2. The disk drive device according to claim 1, wherein the porous member includes sintered metal.

3. The disk drive device according to claim 1, wherein the porous member includes at least a first layer and a second layer,
the first layer being configured to allow foreign matter having a size less than 0.5 µm to pass therethrough, whereas the first layer is configured to capture foreign matter of a size of 1.0 µm or greater, and the second layer captures foreign matter of a size of 0.3 µm or greater.

4. The disk drive device according to claim 1, wherein
an end of the radial space is in communication with a capillary seal, and
a cover member covering at least a portion of an opened end of the capillary seal is disposed outside the opened end.

5. The disk drive device according to claim 1, wherein at least one of the inner wall surface of the sleeve and the outer wall surface of the shaft is made of SIALON ceramic.

6. The disk drive device according to claim 1, wherein
the sleeve includes a circulation path through which the lubricant circulates in a direction along the shaft, and
the porous member is disposed within the circulation path.

7. A disk drive device, comprising:
a base member;
a bearing unit that is disposed in the base member and that rotatably supports a recording disk with respect to the base member; and
a drive unit configured to rotationally drive the recording disk supported by the bearing unit,
the bearing unit including:
  a shaft that is a center of rotation;
  a sleeve that has an accommodating portion in which the shaft is accommodated and that is configured to permit relative rotation around the shaft;
  a radial space defined by an inner wall surface of the accommodating portion of the sleeve and an outer wall surface of the shaft;
  a radial dynamic pressure groove configured to generate a radial dynamic pressure and formed in at least one of the inner wall surface of the sleeve and the outer wall surface of the shaft that define the radial space;
  a lubricant charged into the radial space; and
  a porous member that is disposed in at least a portion of a charging space into which the lubricant is charged, for capturing foreign matter contained in the lubricant;
wherein the porous member is made of nonwoven fabric.

8. The disk drive device according to claim 7, wherein the porous member is a filter of a multi-layer structure, and a density of the filter is varied from a rough state to a dense state in correspondence with a moving direction of foreign matter contained in the lubricant.

9. The disk drive device according to claim 7, wherein the porous member includes at least a first layer and a second layer,
the first layer being configured to allow foreign matter having a size less than 0.5 µm to pass therethrough, whereas the first layer is configured to capture foreign matter of a size of 1.0 µm or greater, and the second layer is configured to capture foreign matter of a size of 0.3 µm or greater.

10. The disk drive device according to claim 7, wherein
an end of the radial space is in communication with a capillary seal, and
a cover member covering at least a portion of an opened end of the capillary seal is disposed outside the opened end.

11. The disk drive device according to claim 7, wherein at least one of the inner wall surface of the sleeve and the outer wall surface of the shaft is made of SIALON ceramic.

12. The disk drive device according to claim 7, wherein
the sleeve includes a circulation path through which the lubricant circulates in a direction along the shaft, and
the porous member is disposed within the circulation path.

* * * * *